(12) United States Patent
Lin et al.

(10) Patent No.: US 11,194,824 B2
(45) Date of Patent: *Dec. 7, 2021

(54) PROVIDING OBLIVIOUS DATA TRANSFER BETWEEN COMPUTING DEVICES

(71) Applicant: Advanced New Technologies Co., Ltd., Grand Cayman (KY)

(72) Inventors: Wenzhen Lin, Hangzhou (CN); Lichun Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,818

(22) Filed: Mar. 1, 2021

(65) Prior Publication Data

US 2021/0182288 A1    Jun. 17, 2021

Related U.S. Application Data

(63) Continuation of application No. 16/776,216, filed on Jan. 29, 2020, now Pat. No. 10,936,605, which is a
(Continued)

(30) Foreign Application Priority Data

Apr. 19, 2019   (CN) .......................... 201910316475.4

(51) Int. Cl.
*G06F 21/00* (2013.01)
*G06F 16/2458* (2019.01)
(Continued)

(52) U.S. Cl.
CPC ........ *G06F 16/2462* (2019.01); *G06F 21/602* (2013.01); *G06F 21/6245* (2013.01); *H04L 63/0428* (2013.01)

(58) Field of Classification Search
CPC ............... G06F 16/2462; G06F 21/602; G06F 21/6245; H04L 63/0428
See application file for complete search history.

(56) References Cited

U.S. PATENT DOCUMENTS 9,697,248 B1 *   7/2017  Ahire ..................... G06N 5/025
2004/0250100 A1  12/2004 Agrawal et al.
(Continued)

FOREIGN PATENT DOCUMENTS

CN          101266672        9/2008
CN          101895530        11/2010
(Continued)

OTHER PUBLICATIONS

Ghasemzadeh et al., "A Body Sensor Network With Electromyogram and Inertial Sensors: Multimodal Interpretation of Muscular Activities", IEEE Transactions on Information Technology in Biomedicine, vol. 14, Issue: 2, March (Year: 2009).*
(Continued)

*Primary Examiner* — Morshed Mehedi
(74) *Attorney, Agent, or Firm* — Fish & Richardson P.C.

(57) ABSTRACT

Implementations of this specification provide methods and apparatuses for oblivious data transfer between computing devices. An example method includes receiving, by a second computing device, an oblivious transfer from a first computing device. The first computing device splits feature data in a feature dataset into a plurality of sub-data and uses the plurality of sub-data as input, and the second computing device uses label data in a label dataset as input. The second computing device selects target sub-data from the plurality of sub-data input by the first computing device, and determines a first summation result of the selected target sub-data. The second computing device receives from the first computing device a second summation result of the one or more splitting parameters in the splitting parameter set, and
(Continued)

calculates a statistical indicator based on the first summation result and the second summation result.

18 Claims, 9 Drawing Sheets

Related U.S. Application Data continuation of application No. PCT/CN2020/071184, filed on Jan. 9, 2020.

(51) Int. Cl.
*H04L 29/06* (2006.01)
*G06F 21/60* (2013.01)
*G06F 21/62* (2013.01)

(56) References Cited

U.S. PATENT DOCUMENTS

| | | | |
|---|---|---|---|
| 2013/0085916 A1* | 4/2013 | Abbe | H04L 9/3218 705/35 |
| 2014/0184803 A1 | 7/2014 | Chu et al. | |
| 2016/0371684 A1* | 12/2016 | Abbott | H04L 63/0428 |
| 2017/0149796 A1 | 5/2017 | Gvili | |
| 2018/0150757 A1 | 5/2018 | Aggarwal et al. | |
| 2019/0065739 A1 | 2/2019 | Manadhata et al. | |
| 2020/0013120 A1* | 1/2020 | Brown | G06Q 40/06 |
| 2020/0019420 A1 | 1/2020 | Saimani et al. | |

FOREIGN PATENT DOCUMENTS

| | | |
|---|---|---|
| CN | 107347096 | 11/2017 |
| CN | 107451266 | 12/2017 |
| CN | 108416221 | 8/2018 |
| CN | 108600159 | 9/2018 |
| CN | 108809623 | 11/2018 |
| CN | 109255247 | 1/2019 |
| CN | 109543453 | 3/2019 |
| CN | 109583224 | 4/2019 |
| CN | 110162551 | 8/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Geng, "Research on Several Secure Multi-Party Computation Problems and Applications," Full text Database of Chinese Doctoral Dissertations, Jan. 2013, pp. 1-110.

Nakamoto, "Bitcoin: A Peer-to-Peer Electronic Cash System," www.bitcoin.org, 2005, 9 pages.

PCT International Search Report and Written Opinion in International Application No. PCT/CN2020/071184, dated Apr. 8, 2020, 19 pages (with machine translation).

Rodriguez et al., "Rotation Forest: A New Classifier Ensemble Method," IEEE Transactions on Pattern Analysis and Machine Intelligence, Oct. 2006, 28(10):1619-1630.

Shi et al., "A Novel Oblivious Transfer Protocol with Statistical Analysis," ACTA Electronica Sinica, Nov. 2014, 42(11):2273-2279 (with English absliact).

* cited by examiner

PROVIDING OBLIVIOUS DATA TRANSFER BETWEEN COMPUTING DEVICES

CROSS-REFERENCE TO RELATED APPLICATIONS

This application is a continuation of and claims the benefit of priority of U.S. patent application Ser. No. 16/776,216, filed Jan. 29, 2020, which is a continuation of PCT Application No. PCT/CN2020/071184, filed on Jan. 9, 2020, which claims priority to Chinese Patent Application No. 201910316475.4, filed on Apr. 19, 2019, and each application is hereby incorporated by reference in its entirety.

TECHNICAL FIELD

Implementations of the present specification relate to the field of computer technologies, and in particular to a data processing method and apparatus, and electronic equipment.

BACKGROUND

In business practice, data owned by a single data party is incomplete, and usually needs to be used with data of another data party to jointly complete statistic calculation on some data indicators. In a cooperative calculation process, data leakage often occurs.

SUMMARY

An objective of implementations of the present specification is to provide a data processing method and apparatus, and electronic equipment so that various data parties can jointly complete data indicator statistics without leaking their own data.

To achieve the previous objective, one or more implementations of the present specification provide the following technical solutions:

According to a first aspect of one or more implementations of the present specification, a data processing method is provided, where the method is applied to a first device and includes the following: splitting feature data in a feature dataset into a plurality of sub-data by using a splitting parameter in a splitting parameter set; performing oblivious transfer with a second device by using the plurality of sub-data as input; performing summation on the splitting parameter in the splitting parameter set; and sending a summation result to the second device.

According to a second aspect of one or more implementations of the present specification, a data processing apparatus is provided, where the apparatus is applied to a first device and includes the following: a splitting unit, configured to split feature data in a feature dataset into a plurality of pieces of sub-data by using a splitting parameter in a splitting parameter set; a transmission unit, configured to perform oblivious transfer with a second device by using the plurality of sub-data as input; a calculation unit, configured to perform summation on the splitting parameter in the splitting parameter set; and a sending unit, configured to send a summation result to the second device.

According to a third aspect of one or more implementations of the present specification, electronic equipment is provided, where the electronic equipment includes the following: a memory, configured to store a computer instruction; and a processor, configured to execute the computer instruction to implement the method step according to the first aspect.

According to a fourth aspect of one or more implementations of the present specification, a data processing method is provided, where the method is applied to a second device and includes the following: performing oblivious transfer with a first device by using label data in a label dataset as input, and selecting target sub-data from a plurality of sub-data input by the first device, where the plurality of sub-data are obtained based on a splitting parameter in a splitting parameter set; performing summation on the selected target sub-data to obtain a first summation result; receiving a second summation result from the first device, where the second summation result is obtained by performing summation on the splitting parameter in the splitting parameter set; and calculating a statistical indicator based on the first summation result and the second summation result.

According to a fifth aspect of one or more implementations of the present specification, a data processing apparatus is provided, where the apparatus is applied to a second device and includes the following: a transmission unit, configured to perform oblivious transfer with a first device by using label data in a label dataset as input, and select target sub-data from a plurality of sub-data input by the first device, where the plurality of sub-data are obtained based on a splitting parameter in a splitting parameter set; a first calculation unit, configured to perform summation on the selected target sub-data to obtain a first summation result; a receiving unit, configured to receive a second summation result from the first device, where the second summation result is obtained by performing summation on the splitting parameter in the splitting parameter set; and a second calculation unit, configured to calculate a statistical indicator based on the first summation result and the second summation result.

According to a sixth aspect of one or more implementations of the present specification, electronic equipment is provided, where the electronic equipment includes the following: a memory, configured to store a computer instruction; and a processor, configured to execute the computer instruction to implement the steps according to the fourth aspect.

As can be seen from the technical solutions provided in the previous implementations of the present specification, in some implementations of the present specification, the first device and the second device can perform cooperative calculation to complete data indicator statistics without leaking their own data.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

The following clearly describes the technical solutions in some implementations of the present specification with reference to the accompanying drawings in some implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification. It is worthwhile to note that descriptions of "first", "second", etc. in the present specification are intended to distinguish between different messages, devices, modules, etc. and neither represent a sequence nor limit "first" and "second" to different types.

Figure 1:
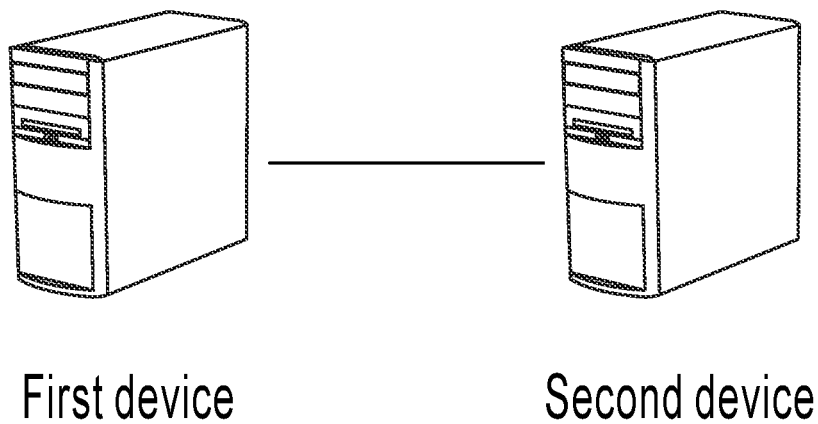
FIG. 1 is a schematic diagram illustrating a functional structure of a data processing system, according to an implementation of the present specification.

References are made to FIG. 1. The implementations of the present specification provide a data processing system.

In some implementations, the data processing system can include a first device. The first device can be a device such as a server, a mobile phone, a tablet computer, or a personal computer, or can be a system that includes a plurality of devices, for example, a server cluster that includes a plurality of servers. The first device can provide feature datasets. A storage form of the feature dataset in the first device includes but is not limited to an array, a vector, a matrix, a linear table, etc. The feature dataset can include at least one piece of feature data, which can be used to reflect features of a service target. For example, the service target can be a user, and the feature data can be a user's loan amount, a user's social security contribution base, etc.

In some implementations, the data processing system can further include a second device. The second device can be a device such as a server, a mobile phone, a tablet computer, or a personal computer, or can be a system that includes a plurality of devices, for example, a server cluster consisting of a plurality of servers. The second device can provide label datasets. A storage form of the label dataset in the second device includes but is not limited to an array, a vector, a matrix, a linear table, etc. The label dataset can include at least one piece of label data, which can be used to reflect a type of a service target. For example, the service target can be a user, and the label data can be used to identify whether the user is a student, whether the user is a dishonest person, whether the user pays for social security, whether the user has a loan record, and so on. A value of the label data can be a binary value. For example, the value of the label data can be taken from 0 and 1. The value 0 is used to identify that the user is a dishonest person, and the value 1 is used to identify that the user is not a dishonest person. It is worthwhile to note that the values 0 and 1 here are merely examples, and the value of the label data can also be another value depending on an actual business demand. For example, the value of the label data can be taken from 0 and −1. The value 0 is used to identify that the user is a dishonest person, and the value −1 is used to identify that the user is not a dishonest person.

In some implementations, data owned by a single data party is incomplete, and needs to be used with data of another data party to jointly complete statistic calculation on some data indicators. To protect privacy, data parties participated in statistic calculation cannot leak their own data. Specifically, in the present implementation, the first device and the second device can perform cooperative calculation to complete statistic calculation on some data indicators without leaking their own data. For example, the first device can own a feature dataset, and feature data in the feature dataset can be a user's loan amount. The second device can own a label dataset, and label data in the label dataset can be used to identify whether a user pays for social security. The first device and the second device can perform cooperative calculation to complete statistic calculation on the sum of the loan amounts of a user who pays for social security.

For ease of statistic calculation, a mapping relationship between feature data in the feature dataset and label data in the label dataset can be established. The feature data and the label data that have the mapping relationship are targeted at the same service target. In practice, the mapping relationship can be established based on an identifier of the service target. Specifically, both the feature data in the feature dataset and the label data in the label dataset can correspond to an identifier of the service target. As such, a mapping relationship can be established between the label data and the feature data that correspond to the same identifier. For example, the service target can be a user, and the identifier can be the user's mobile number, the user's account, etc. In an example scenario, the feature dataset can be represented as a vector $X=[x_1, x_2, \ldots, x_i, \ldots, x_n]$. The label dataset can be represented as a vector $Y=[y_1, y_2, \ldots, y_i, y_n]$. $x_i$ represents feature data, $y_i$ represents label data, $1 \leq i \leq n$, and n represents a data amount. The feature data $x_i$ and the label data $y_i$ correspond to the same identifier, such as a certain user's mobile number. Therefore, there is a mapping relationship between the feature data $x_i$ and the label data $y_i$. Certainly, the mapping relationship between the feature data and the label data can be established by other means in practice, which is not specifically limited in the present specification.

Figure 2:
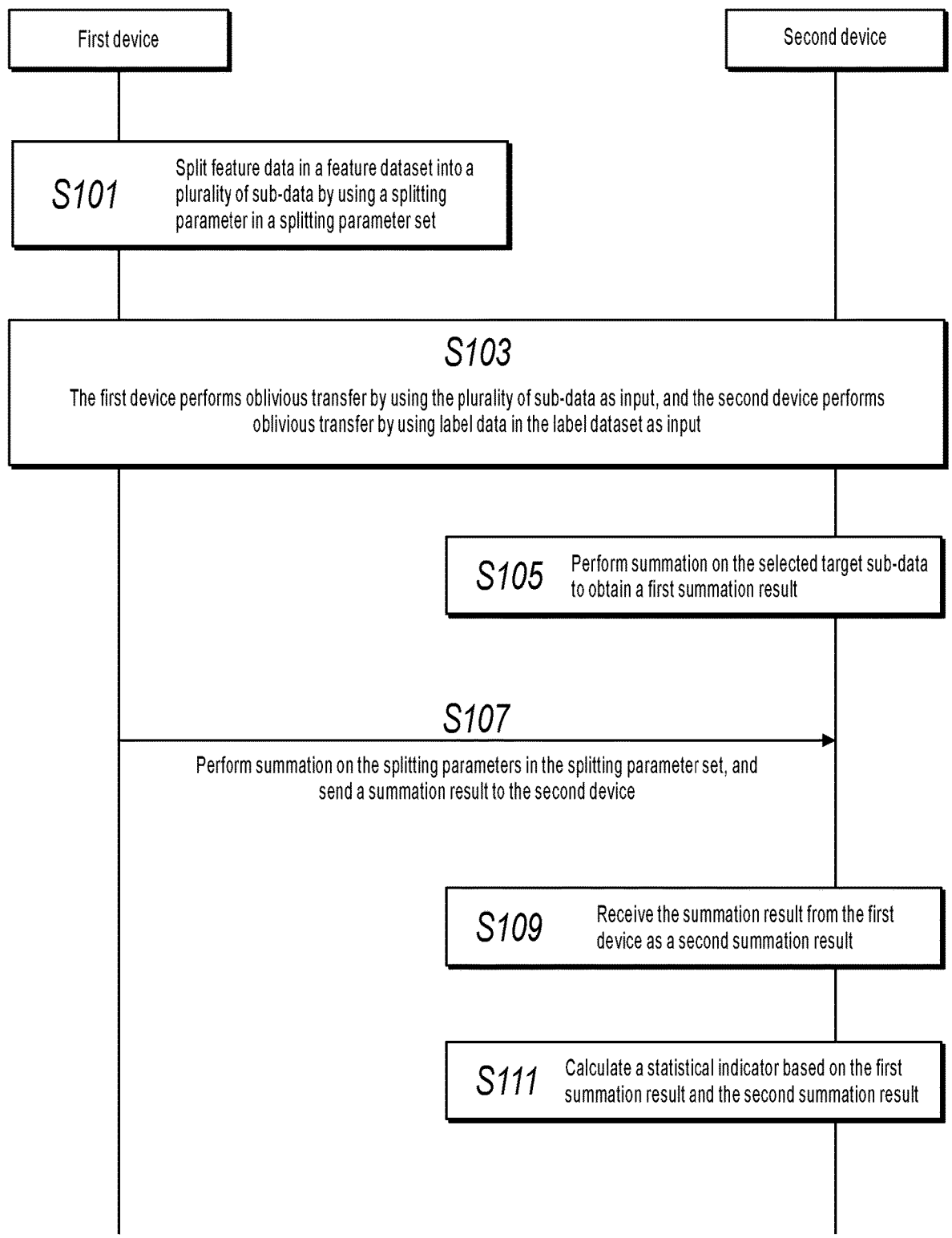
FIG. 2 is a flowchart illustrating a data processing method, according to an implementation of the present specification.
Figure 3:
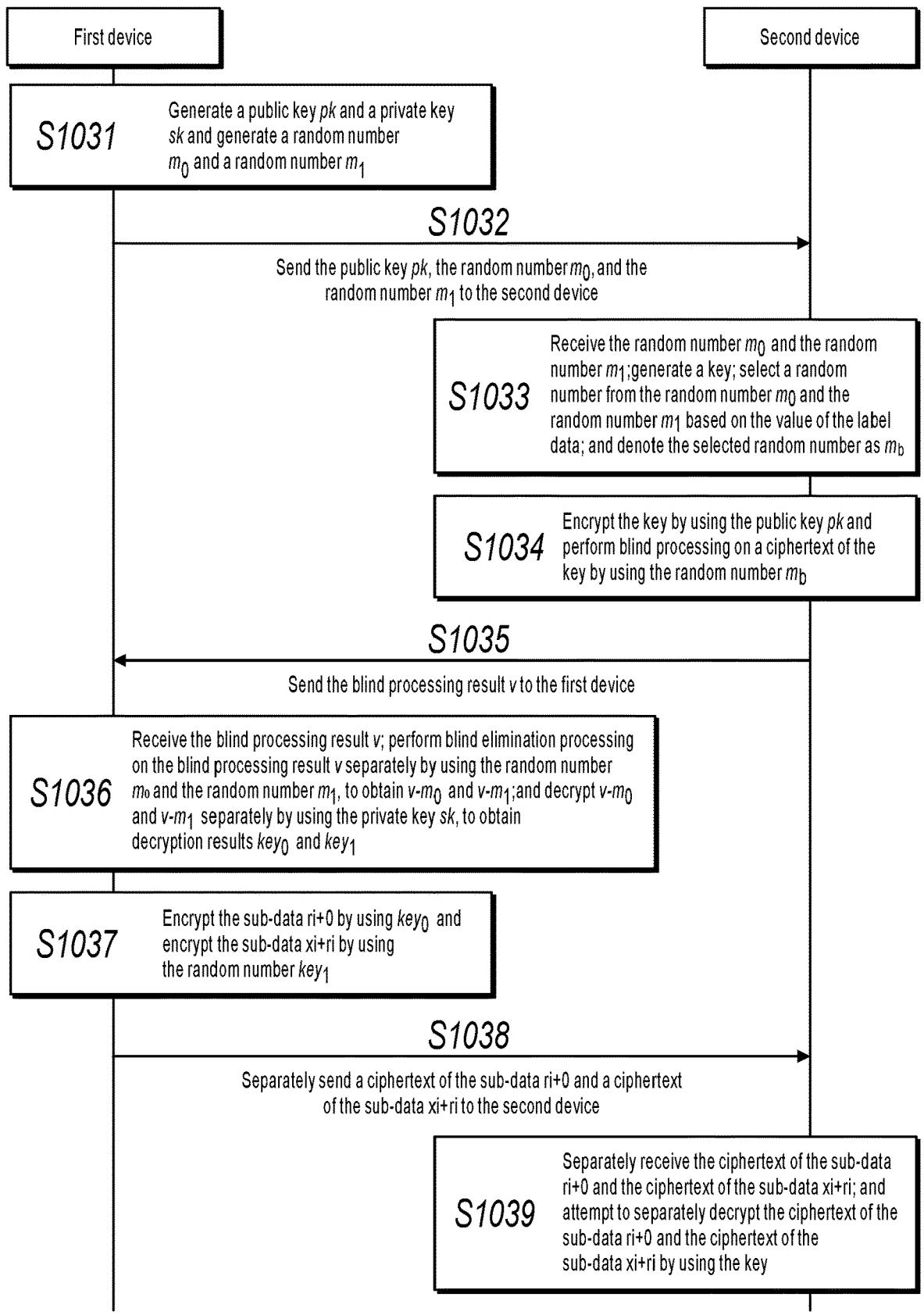
FIG. 3 is a flowchart illustrating an oblivious transfer method, according to an implementation of the present specification.

Based on the data processing system, the present specification provides an implementation of the data processing method. Further references are made to FIG. 2 and FIG. 3. The implementation can include the following steps.

S101: A first device splits feature data in a feature dataset into a plurality of sub-data by using a splitting parameter in a splitting parameter set.

In some implementations, the splitting parameter set can be generated by the first device. A storage form of the splitting parameter set in the first device includes but is not limited to an array, a vector, a matrix, a linear table, etc. The splitting parameter set can include at least one splitting parameter. The splitting parameter can be a random number, which is used to split the feature data.

There can be a mapping relationship between the splitting parameter in the splitting parameter set and the feature data in the feature dataset, so that the feature data in the feature dataset can be split by using the splitting parameter in the splitting parameter set. Referring back to the previous example scenario, the splitting parameter set can be represented as a vector $R=[r_1, r_2, \ldots, r_i, \ldots, r_n]$, where $r_i$ represents the splitting parameter. There can be a mapping relationship between the feature data $r_i$ and the label data $x_i$.

In some implementations, for each piece of feature data in the feature dataset, the first device can split the feature data into a plurality of sub-data by using a splitting parameter corresponding to the feature data in the splitting parameter set, for example, split the feature data into two, three, or four pieces of sub-data. In practice, the first device can perform summation on the feature data and the splitting parameter, and can split a summation result into a plurality of sub-data. As such, the feature data is split into a plurality of sub-data by using the splitting parameter. Referring back to the previous example scenario, the first device can split the feature data $x_i$ into two pieces of sub-data such as sub-data $x_i+r_i$ and sub-data $r_i+0$ by using the splitting parameter $r_i$.

S103: The first device performs oblivious transfer by using the plurality of sub-data as input, and the second device performs oblivious transfer by using label data in the label dataset as input.

In some implementations, oblivious transfer (OT) is a communication protocol that can protect privacy and enable both communication parties to transmit data in a fuzzy way. A sending party can have a plurality of pieces of data. Through oblivious transfer, a receiving party can obtain one or more pieces of data in the plurality of pieces of data. In such process, the sending party does not know what data the receiving party receives, and the receiving party cannot obtain any data other than the data it receives. Specifically, in the present implementation, the first device can perform oblivious transfer by using the plurality of sub-data obtained by splitting each piece of feature data in the feature data as input, and the second device can perform oblivious transfer by using the label data corresponding to the feature data in the label dataset as input. Through oblivious transfer, the second device can select the target sub-data from the plurality of sub-data input by the first device. The plurality of sub-data obtained by splitting the feature data can be considered as secret information input by the first device in the oblivious transfer process, and the label data corresponding to the feature data can be considered as selection information input by the second device in the oblivious transfer process. As such, the second device can select the target sub-data. Based on characteristics of oblivious transfer, the first device does not know which sub-data the second device selects as the target sub-data, nor can the second device know sub-data other than the selected target sub-data.

Figure 4:
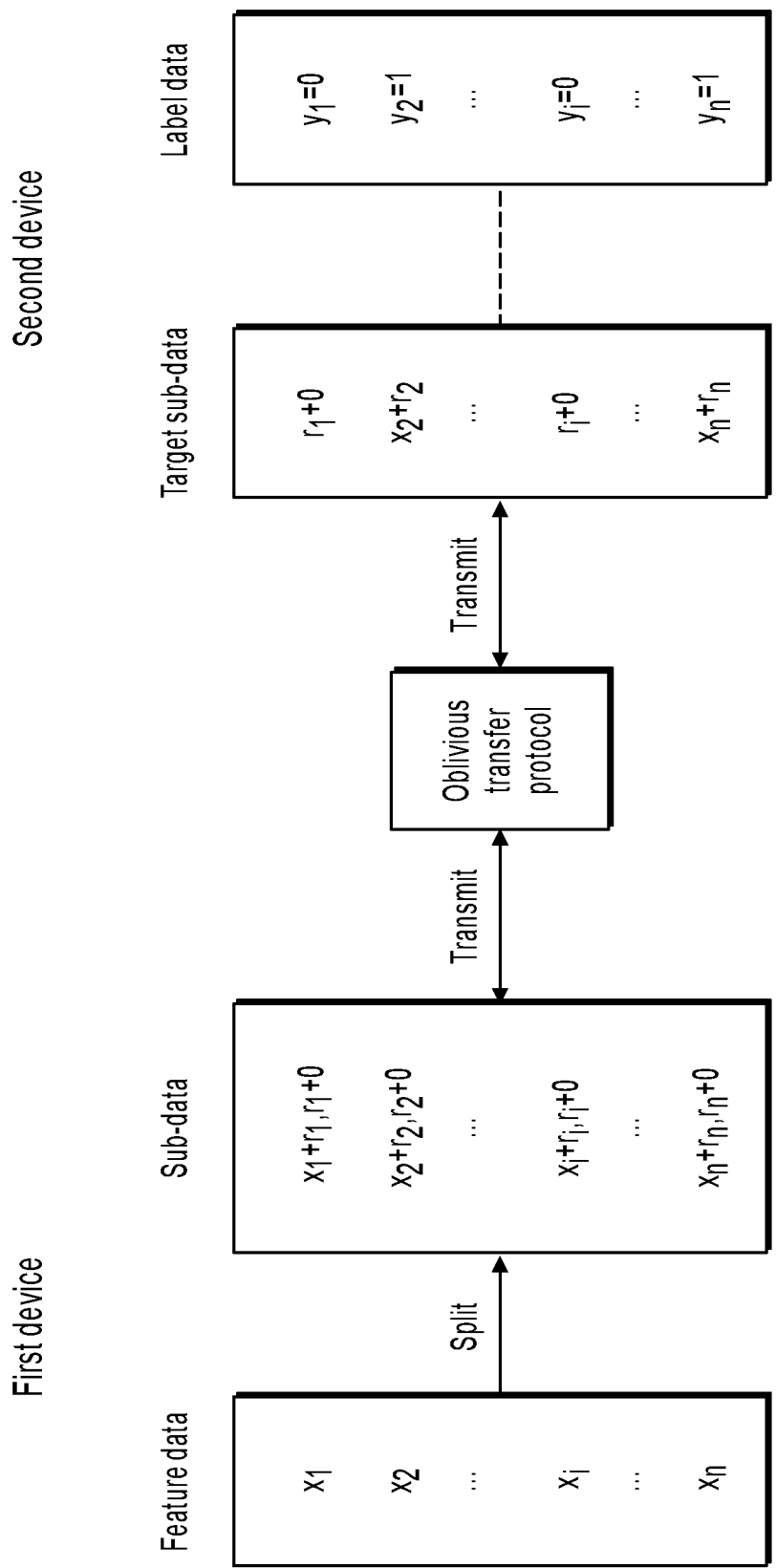
FIG. 4 is a schematic diagram illustrating a data processing method, according to an implementation of the present specification.

Referring back to the previous example scenario, the following describes the process of oblivious transfer by the first device and the second device in the example scenario. In the example scenario, the sub-data obtained by splitting the feature data $x_i$ includes $x_i+r_i$ and $r_i+0$. The sub-data $x_i+r_i$ and $r_i+0$ can be considered as the secret information input by the first device in the oblivious transfer process. The label data $y_i$ can be considered as selection information input by the second device in the oblivious transfer process. The value of the label data $y_i$ can be taken from 0 and 1. Through oblivious transfer, when the value of the label data $y_i$ is 0, the second electronic equipment selects the sub-data $r_i+0$ as the target sub-data; when the value of the label data $y_i$ is 1, the second electronic equipment selects the sub-data $x_i+r_i$ as the target sub-data. In addition, a person skilled in the art should understand that the oblivious transfer process here is merely an example. In practice, the oblivious transfer process can have other variants or variations, which also fall within the disclosure and protection scopes of the present specification. References are made to FIG. 4. The oblivious transfer process can include the following steps.

S1031: The first device generates a public key pk and a private key sk and generates a random number $m_0$ and a random number $m_1$.

The public key pk and the private key sk can be a public/private key pair having a mapping relationship.

S1032: The first device sends the public key pk, the random number $m_0$, and the random number $m_1$ to the second device.

S1033: The second device receives the random number $m_0$ and the random number $m_1$; generates a key; selects a random number from the random number $m_0$ and the random number $m_1$ based on the value of the label data $y_i$; and denotes the selected random number as $m_b$.

When the value of the label data $y_i$ is 0, the second device can select the random number $m_0$, and denote the selected random number $m_0$ as $m_b$. When the value of the label data $y_i$ is 1, the second device can select the random number $m_1$, and denote the selected random number $m_1$ as $m_b$.

S1034: The second device encrypts the key by using the public key pk and performs blind processing on a ciphertext of the key by using the random number $m_b$.

The second device can encrypt the key by using the public key pk to obtain the ciphertext of the key, and can calculate $v=d+m_b$ to implement blind processing. Here, v represents a blind processing result and d represents the ciphertext of the key.

S1035: The second device sends the blind processing result v to the first device.

S1036: The first device receives the blind processing result v; performs blind elimination processing on the blind processing result v separately by using the random number $m_0$ and the random number $m_1$, to obtain $v-m_0$ and $v-m_1$; and decrypts $v-m_0$ and $v-m_1$ separately by using the private key sk, to obtain decryption results $key_0$ and $key_1$.

The first device can calculate $v-m_0$ so as to perform blind elimination processing on the blind processing result v by using the random number $m_0$; can calculate $v-m_1$ so as to perform blind elimination processing on the blind processing result v by using the random number $m_1$; can decrypt $v-m_0$ by using the private key sk, to obtain the decryption result $key_0$; and can decrypt $v-m_1$ by using the private key sk, to obtain the decryption result $key_1$.

S1037: The first device encrypts the sub-data $r_i+0$ by using the decryption result $key_0$ and encrypts the sub-data $x_i+r_i$ by using the decryption result $key_1$.

S1038: The first device separately sends a ciphertext of the sub-data $r_i+0$ and a ciphertext of the sub-data $x_i+r_i$ to the second device.

S1039: The second device separately receives the ciphertext of the sub-data $r_i+0$ and the ciphertext of the sub-data $x_i+r_i$ and attempts to separately decrypt the ciphertext of the sub-data $r_i+0$ and the ciphertext of the sub-data $x_i+r_i$ by using the key.

When the value of the label data $y_i$ is 0, $m_b=m_0$. Therefore, the second device can successfully decrypt the ciphertext of the sub-data $r_i+0$ by using the key, to obtain the sub-data $r_i+0$, but fails to decrypt the ciphertext of the sub-data $x_i+r_i$ by using the key. As such, when the value of the label data $y_i$ is 0, the second electronic equipment selects the sub-data $r_i+0$ as the target sub-data. When the value of the label data $y_i$ is 1, $m_b=m_1$. Therefore, the second device can successfully decrypt the ciphertext of the sub-data $x_i+r_i$ by using the key, to obtain the sub-data $x_i+r_i$, but fails to decrypt the ciphertext of the sub-data $r_i+0$ by using the key. As such, when the value of the label data $y_i$ is 1, the second electronic equipment selects the sub-data $x_i+r_i$ as the target sub-data.

S105: The second device performs summation on the selected target sub-data to obtain a first summation result.

In some implementations, by performing S103, the second device can select one piece of target sub-data for each piece of label data in the label dataset. As such, the number of target sub-data selected by the second device can be the same as the number of pieces of label data in the label dataset. The second device can perform summation on the selected target sub-data to obtain the first summation result.

S107: The first device performs summation on the splitting parameters in the splitting parameter set, and sends a summation result to the second device.

Referring back to the previous example scenario, the first device can calculate $$sumR = \sum_{i=1}^{n} r_i.$$

S109: The second device receives the summation result from the first device as a second summation result.

S111: The second device calculates a statistical indicator based on the first summation result and the second summation result.

In some implementations, the second device can perform difference calculation on the first summation result and the second summation result to obtain the statistical indicator. Certainly, the difference calculation here is merely an example, and in practice, the second device can also calculate the statistical indicator by other means. The statistical indicator can be used to reflect the sum of feature data corresponding to specific label data in the label dataset. The statistical indicator can be used as a calculation parameter for later processing. For example, in a binning scenario, the first device can calculate a binning indicator based on the statistical indicator and other information. The binning indicator can include information value (IV), a weight of evidence (WoE), etc.

Referring back to the previous example scenario, because both the sub-data $x_i+r_i$ and the sub-data $r_i+0$ include the splitting parameter $r_i$, the target sub-data includes the splitting parameter $r_i$ regardless of whether the second device selects the sub-data $x_i+r_i$ as the target sub-data or selects the sub-data $r_i+0$ as the target sub-data. Therefore, the statistical indicator obtained by performing difference calculation on the first summation result and the second summation result can be used to reflect the sum of feature data corresponding to label data whose value is 1 in the label dataset. For example, the feature data in the feature dataset can be a user's loan amount. The label data in the label dataset can be used to reflect whether a user pays for social security. The value 0 of the label data is used to identify that the user has not paid for social security. The value 1 of the label data is used to identify that the user has paid for social security. The statistical indicator can then be used to reflect the sum of the loan amounts of all users who pay for social security.

According to the data processing method in some implementations of the present specification, the first device can split the feature data in the feature dataset into a plurality of sub-data by using the splitting parameter in the splitting parameter set. The first device performs oblivious transfer by using the plurality of sub-data as input, and the second device performs oblivious transfer by using label data in the label dataset as input. The second device can perform summation on the selected target sub-data to obtain the first summation result. The first device can perform summation on the splitting parameters in the splitting parameter set, and send a summation result to the second device. The second device can receive the summation result as a second summation result, and can calculate a statistical indicator based on the first summation result and the second summation result. As such, the first device and the second device can perform cooperative calculation to complete data indicator statistics without leaking their own data.

Figure 5:
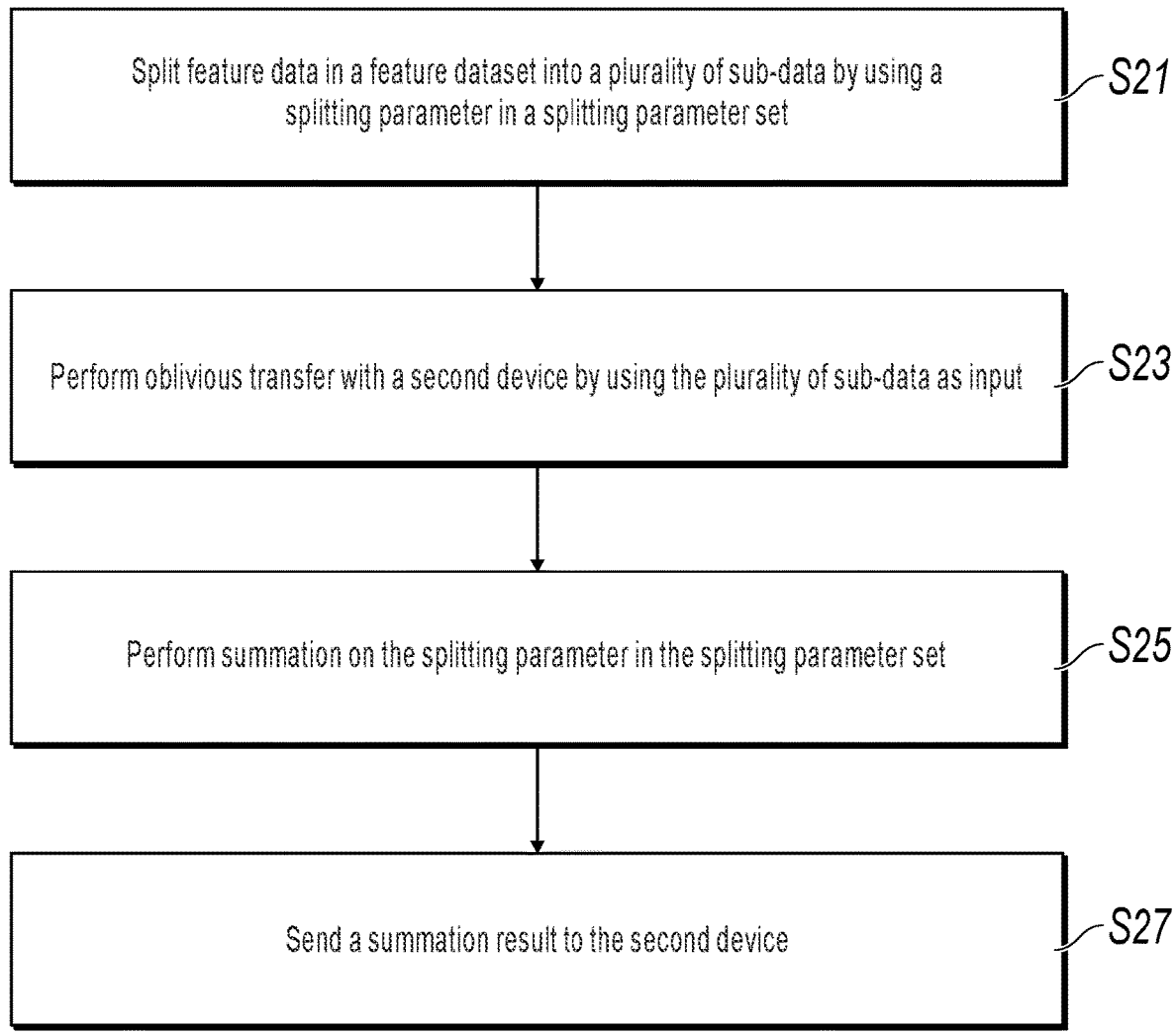
FIG. 5 is a flowchart illustrating a data processing method, according to an implementation of the present specification.

References are made to FIG. 5. The present specification further provides another implementation of a data processing method. The implementation takes the first device as the execution body, and can include the following steps.

S21: Split feature data in a feature dataset into a plurality of sub-data by using a splitting parameter in a splitting parameter set.

In some implementations, the splitting parameter set can be generated by the first device. The splitting parameter set can include at least one splitting parameter. The splitting parameter can be a random number, which is used to split the feature data. The feature dataset can include at least one piece of feature data, which can be used to reflect features of a service target.

In some implementations, for each piece of feature data in the feature dataset, the first device can split the feature data into a plurality of sub-data by using a splitting parameter corresponding to the feature data in the splitting parameter set, for example, split the feature data into two, three, or four pieces of sub-data.

S23: Perform oblivious transfer with a second device by using the plurality of sub-data as input.

In some implementations, the second device can provide a label dataset. The label dataset can include at least one piece of label data, which can be used to reflect a type of a service target. The first device can perform oblivious transfer by using the plurality of sub-data as input, and the second device can perform oblivious transfer by using label data in the label dataset as input. Specifically, the first device can perform oblivious transfer by using the plurality of sub-data obtained by splitting each piece of feature data in the feature data as input, and the second device can perform oblivious transfer by using the label data corresponding to the feature data in the label dataset as input. Through oblivious transfer, the second device can select the target sub-data from the plurality of sub-data input by the first device. The plurality of sub-data obtained by splitting the feature data can be considered as secret information input by the first device in the oblivious transfer process, and the label data corresponding to the feature data can be considered as selection information input by the second device in the oblivious transfer process. As such, the second device can select the target sub-data. Based on characteristics of oblivious transfer, the first device does not know which sub-data the second device selects as the target sub-data, nor can the second device know sub-data other than the selected target sub-data.

S25: Perform summation on the splitting parameter in the splitting parameter set.

S27: Send a summation result to the second device.

According to the data processing method in the present implementation, the first device can split feature data in a feature dataset into a plurality of sub-data by using a splitting parameter in a splitting parameter set; can perform oblivious transfer with a second device by using the plurality of sub-data as input; can perform summation on the splitting parameter in the splitting parameter set; and can send a summation result to the second device. As such, the first device can transmit the data needed for data indicator statistics to the second device without leaking the data owned by the first device.

Figure 6:
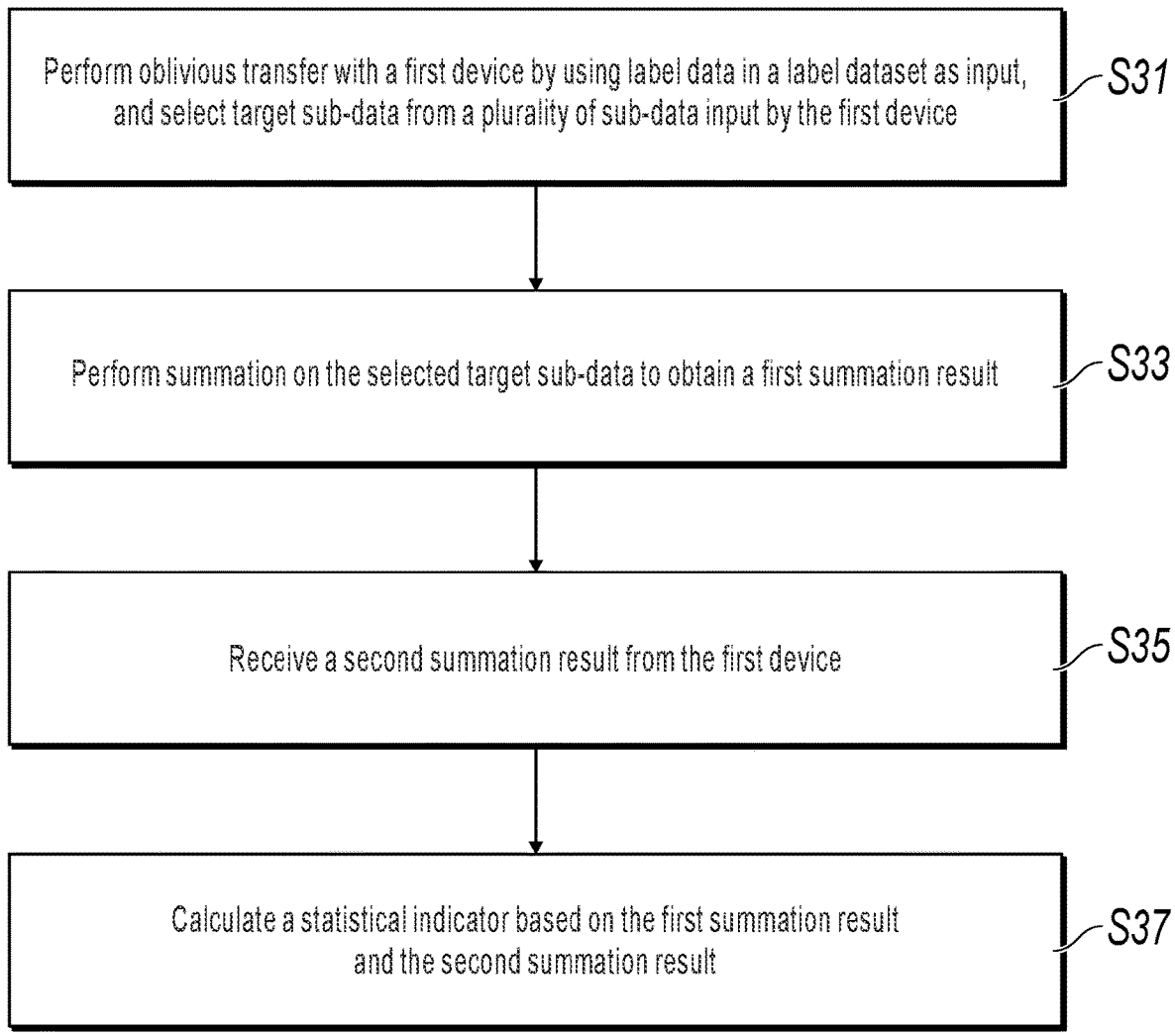
FIG. 6 is a flowchart illustrating a data processing method, according to an implementation of the present specification.

References are made to FIG. 6. The present specification further provides another implementation of a data processing method. The implementation takes the second device as the execution body, and can include the following steps.

S31: Perform oblivious transfer with a first device by using label data in a label dataset as input, and select target sub-data from a plurality of sub-data input by the first device.

In some implementations, the plurality of sub-data can be obtained based on a splitting parameter in a splitting parameter set. For a specific process, references can be made to the previous implementations. The first device can perform oblivious transfer by using the plurality of sub-data as input, and the second device can perform oblivious transfer by using label data in the label dataset as input. Specifically, the first device can perform oblivious transfer by using the plurality of sub-data obtained by splitting each piece of feature data in the feature data as input, and the second device can perform oblivious transfer by using the label data corresponding to the feature data in the label dataset as input. Through oblivious transfer, the second device can select the target sub-data from the plurality of sub-data input by the first device. The plurality of sub-data obtained by splitting the feature data can be considered as secret information input by the first device in the oblivious transfer process, and the label data corresponding to the feature data can be considered as selection information input by the second device in the oblivious transfer process. As such, the second device can select the target sub-data. Based on characteristics of oblivious transfer, the first device does not know which sub-data the second device selects as the target sub-data, nor can the second device know sub-data other than the selected target sub-data.

S33: Perform summation on the selected target sub-data to obtain a first summation result.

In some implementations, the second device can select one piece of target sub-data for each piece of label data in the label dataset. As such, the number of target sub-data selected by the second device can be the same as the number of pieces of label data in the label dataset. The second device can perform summation on the selected target sub-data to obtain the first summation result.

S35: Receive a second summation result from the first device.

In some implementations, the first device can perform summation on the splitting parameters in the splitting parameter set, and can send a summation result to the second device. The second device can receive the summation result from the first device as a second summation result.

S37: Calculate a statistical indicator based on the first summation result and the second summation result.

In some implementations, the second device can perform difference calculation on the first summation result and the second summation result to obtain the statistical indicator. The statistical indicator can be used to reflect the sum of feature data corresponding to specific label data in the label dataset. The statistical indicator can be used as a calculation parameter for later processing. For example, in a binning scenario, the first device can calculate a binning indicator based on the statistical indicator and other information. The binning indicator can include IV, WoE, etc.

According to the data processing method in the present implementation, the second device can perform oblivious transfer with the first device by using the label data in the label dataset as input, and select the target sub-data from the plurality of sub-data input by the first device; can perform summation on the selected target sub-data to obtain the first summation result; can receive the second summation result from the first device; and can calculate the statistical indicator based on the first summation result and the second summation result. As such, the second device can complete data indicator statistics by using the data transmitted by the first device without leaking the data owned by the second device.

Figure 7:
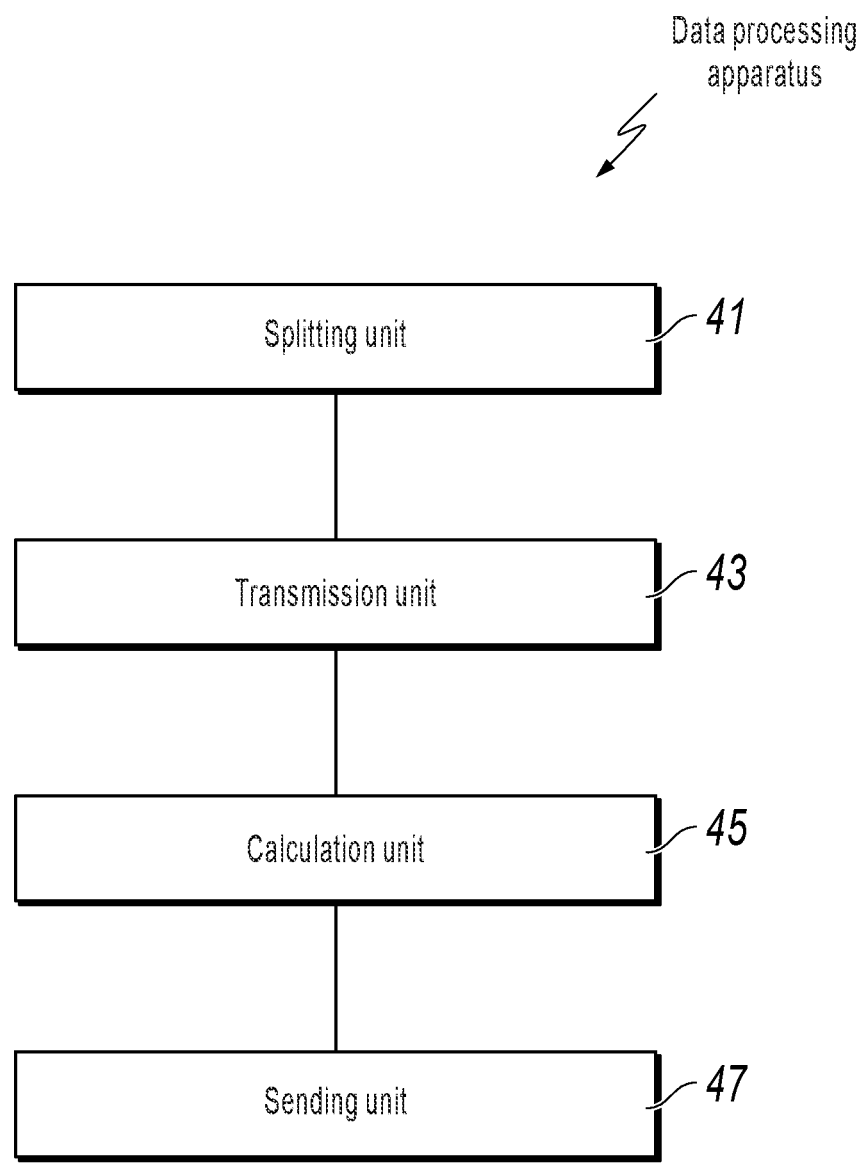
FIG. 7 is a schematic diagram illustrating a functional structure of a data processing apparatus, according to an implementation of the present specification.

References are made to FIG. 7. The present specification further provides another implementation of a data processing apparatus. The present implementation can be applied to the first device, and can specifically include the following units: a splitting unit 41, configured to split feature data in a feature dataset into a plurality of sub-data by using a splitting parameter in a splitting parameter set; a transmission unit 43, configured to perform oblivious transfer with a second device by using the plurality of sub-data as input; a calculation unit 45, configured to perform summation on the splitting parameter in the splitting parameter set; and a sending unit 47, configured to send a summation result to the second device.

Figure 8:
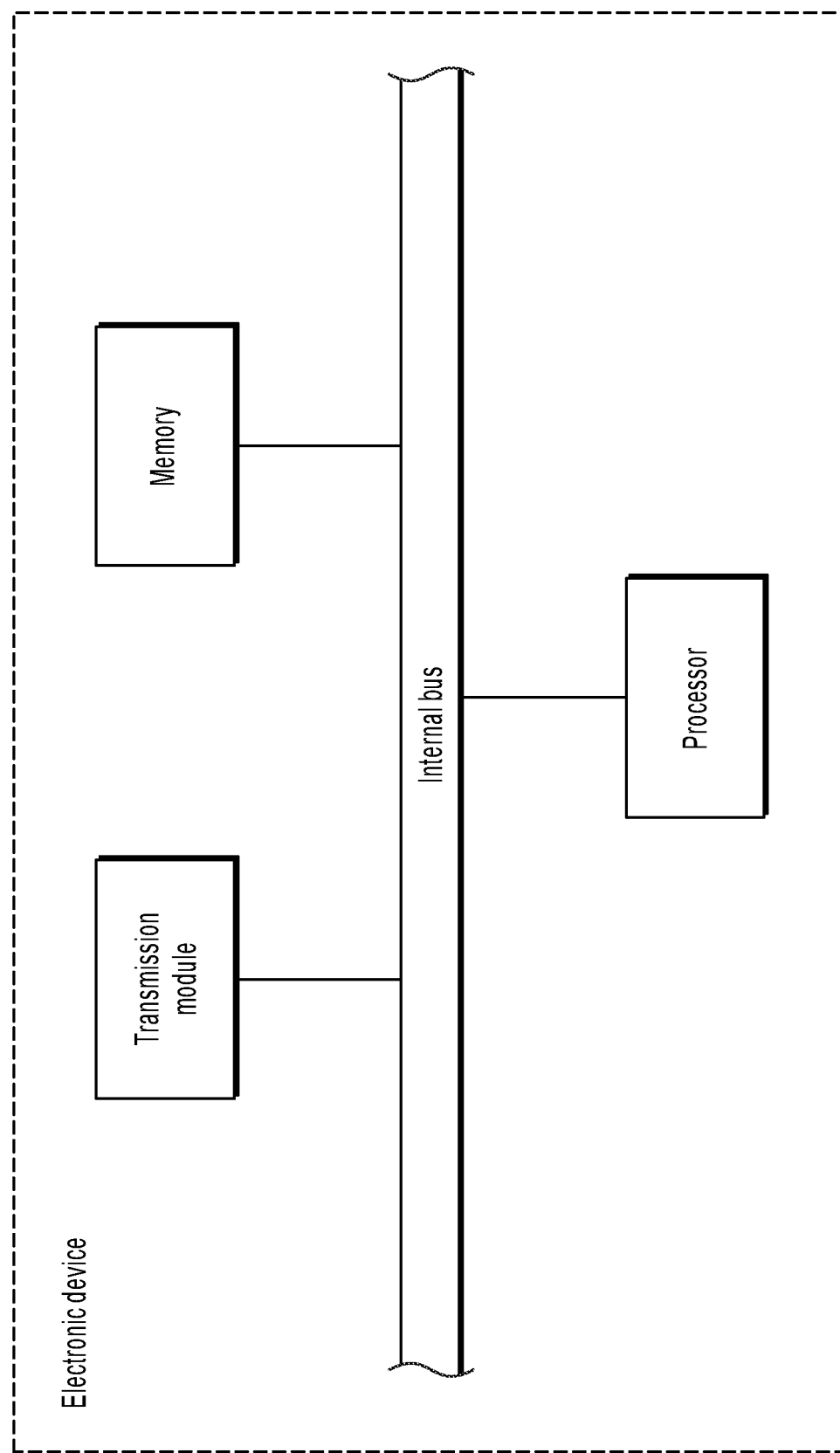
FIG. 8 is a schematic diagram illustrating a functional structure of electronic equipment, according to an implementation of the present specification.

The following describes an implementation of electronic equipment in the present specification. FIG. 8 is a schematic diagram of a hardware structure of electronic equipment in the implementation. As shown in FIG. 8, the electronic equipment can include one or more processors (only one processor is shown in the figure), one or more memories, and one or more transmission modules. Certainly, a person of ordinary skill in the art can understand that the hardware structure shown in FIG. 8 is merely an example, and does not limit the hardware structure of the previous electronic equipment. In practice, the electronic equipment can further include more or less components or units than those shown in FIG. 8, or can have a configuration different from that shown in FIG. 8.

The memory can include a high-speed random access memory, or can further include non-volatile memories, such as one or more magnetic storage devices, flash memories, or other non-volatile solid-state memories. Certainly, the memory can further include a remotely disposed network memory. The remotely disposed network memory can be connected to the electronic equipment by using a network such as the Internet, an intranet, a local area network, or a mobile communications network. The memory can be configured to store a program instruction or module of application software, for example, a program instruction or module of the implementation corresponding to FIG. 4 in the present specification.

The processor can be implemented in any suitable methods. For example, the processor can take the form of, for example, a microprocessor or processor, a computer readable medium storing computer readable program code (such as software or firmware) executable by the microprocessor or processor, a logic gate, a switch, an application specific integrated circuit (ASIC), a programmable logic controller, and an embedded microcontroller. The processor can read and execute the program instruction or module in the memory.

The transmission module can be configured to perform data transmission via a network such as the Internet, an intranet, a local area network, or a mobile communications network.

Figure 9:
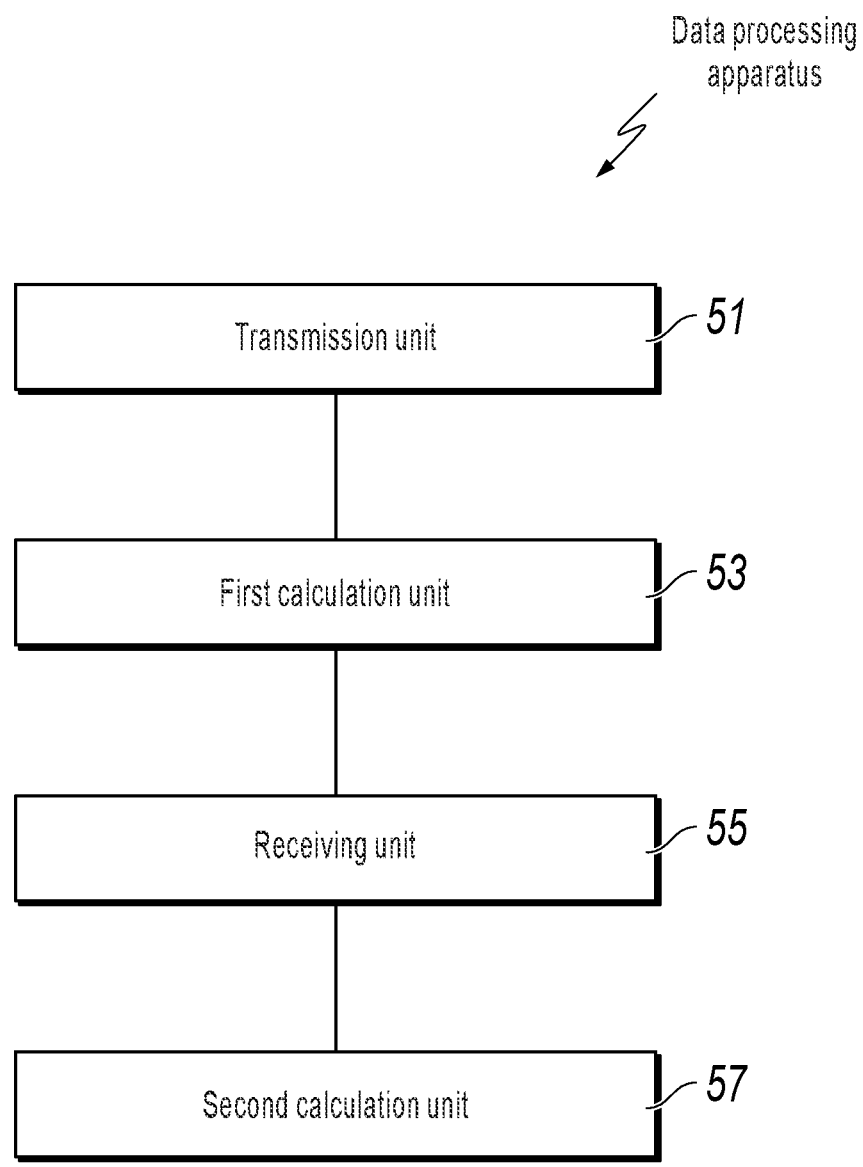
FIG. 9 is a schematic diagram illustrating a functional structure of a data processing apparatus, according to an implementation of the present specification.

References are made to FIG. 9. The present specification further provides another implementation of a data processing apparatus. The present implementation can be applied to the second device, and can specifically include the following units: a transmission unit 51, configured to perform oblivious transfer with a first device by using label data in a label dataset as input, and select target sub-data from a plurality of sub-data input by the first device, where the plurality of sub-data are obtained based on a splitting parameter in a splitting parameter set; a first calculation unit 53, configured to perform summation on the selected target sub-data to obtain a first summation result; a receiving unit 55, configured to receive a second summation result from the first device, where the second summation result is obtained by performing summation on the splitting parameter in the splitting parameter set; and a second calculation unit 57, configured to calculate a statistical indicator based on the first summation result and the second summation result.

The following describes an implementation of electronic equipment in the present specification. FIG. 8 is a schematic diagram of a hardware structure of electronic equipment in the implementation. As shown in FIG. 8, the electronic equipment can include one or more processors (only one processor is shown in the figure), one or more memories, and one or more transmission modules. Certainly, a person of ordinary skill in the art can understand that the hardware structure shown in FIG. 8 is merely an example, and does not limit the hardware structure of the previous electronic equipment. In practice, the electronic equipment can further include more or less components or units than those shown in FIG. 8, or can have a configuration different from that shown in FIG. 8.

The memory can include a high-speed random access memory, or can further include non-volatile memories, such as one or more magnetic storage devices, flash memories, or other non-volatile solid-state memories. Certainly, the memory can further include a remotely disposed network memory. The remotely disposed network memory can be connected to the electronic equipment by using a network such as the Internet, an intranet, a local area network, or a mobile communications network. The memory can be configured to store a program instruction or module of application software, for example, a program instruction or module of the implementation corresponding to FIG. 5 in the present specification.

The processor can be implemented in any suitable methods. For example, the processor can take the form of, for example, a microprocessor or processor, a computer readable medium storing computer readable program code (such as software or firmware) executable by the microprocessor or processor, a logic gate, a switch, an ASIC, a programmable logic controller, and an embedded microcontroller. The processor can read and execute the program instruction or module in the memory.

The transmission module can be configured to perform data transmission via a network such as the Internet, an intranet, a local area network, or a mobile communications network.

It is worthwhile to note that the implementations in the present specification are progressively described, for the same or similar parts in some implementations, references can be made to each other, and each implementation focuses on a difference from other implementations. In particular, the apparatus implementation and the electronic equipment implementation are basically similar to the data processing method implementation, and therefore are described briefly; for related parts, references can be made to the related descriptions in the data processing method implementation.

In addition, it can be understood that, after reading the present specification document, a person skilled in the art can figure out any combination of some or all of the implementations enumerated in the present specification without creative efforts, and these combinations also fall within the disclosure and protection scopes of the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the previous implementations can be implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

It can be seen from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in some implementations or in some parts of the implementations of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, programmable user electronic equipment, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A method comprising:
for each piece of feature data in a feature dataset, splitting, by a first computing device, the feature data into a plurality of sub-data, by using a corresponding splitting parameter in a splitting parameter set;
performing an oblivious transfer, by the first computing device and with a second computing device, wherein the first computing device inputs the plurality of sub-data, and the second computing device inputs label data in a label dataset, wherein the second computing device selects target sub-data from the plurality of sub-data input by the first computing device and corresponding to the label data, wherein the plurality of sub-data corresponding to the label data are obtained by splitting feature data corresponding to the label data;
determining, by the first computing device, a second summation result of one or more splitting parameters in the splitting parameter set; and
sending, by the first computing device and to the second computing device, the second summation result, wherein the second computing device calculates a statistical indicator based on the second summation result, and a first summation result of the target sub-data selected by the second computing device.

2. The method according to claim 1, wherein there is a mapping relationship between the one or more splitting parameters in the splitting parameter set and the feature data in the feature dataset, such that each piece of feature data in the feature dataset is splittable by using the corresponding splitting parameter in the splitting parameter set.

3. The method according to claim 1, wherein each of the one or more splitting parameters is a different random number.

4. The method according to claim 1, wherein the statistical indicator is used to reflect a sum of feature data in the feature dataset corresponding to specific label data in the label dataset.

5. The method according to claim 1, wherein the second computing device calculates the statistical indicator by performing a difference calculation on the first summation result and the second summation result.

6. The method according to claim 1, wherein the label data in the label dataset includes at least one binary value that reflects a type of a service target, and the feature data in the feature dataset reflects one or more features of the service target.

7. A computer-implemented system, comprising:
one or more computing devices; and
one or more computer memory devices interoperably coupled with the one or more computers and having tangible, non-transitory, machine-readable media storing one or more instructions that, when executed by the one or more computers, perform operations comprising:
for each piece of feature data in a feature dataset, splitting, by a first computing device, the feature data into a plurality of sub-data, by using a corresponding splitting parameter in a splitting parameter set;
performing an oblivious transfer, by the first computing device and with a second computing device, wherein the first computing device inputs the plurality of sub-data, and the second computing device inputs label data in a label dataset, wherein the second computing device selects target sub-data from the plurality of sub-data input by the first computing device and corresponding to the label data, wherein the plurality of sub-data corresponding to the label data are obtained by splitting feature data corresponding to the label data;
determining, by the first computing device, a second summation result of one or more splitting parameters in the splitting parameter set; and
sending, by the first computing device and to the second computing device, the second summation result, wherein the second computing device calculates a statistical indicator based on the second summation result, and a first summation result of the target sub-data selected by the second computing device.

8. The system according to claim 7, wherein there is a mapping relationship between the one or more splitting parameters in the splitting parameter set and the feature data in the feature dataset, such that each piece of feature data in the feature dataset is splittable by using the corresponding splitting parameter in the splitting parameter set.

9. The system according to claim 7, wherein each of the one or more splitting parameters is a different random number.

10. The system according to claim 7, wherein the statistical indicator is used to reflect a sum of feature data in the feature dataset corresponding to specific label data in the label dataset.

11. The system according to claim 7, wherein the second computing device calculates the statistical indicator by performing a difference calculation on the first summation result and the second summation result.

12. The system according to claim 7, wherein the label data in the label dataset includes at least one binary value that reflects a type of a service target, and the feature data in the feature dataset reflects one or more features of the service target.

13. A non-transitory, computer-readable medium storing one or more instructions executable by a computer system to perform operations comprising:
- for each piece of feature data in a feature dataset, splitting, by a first computing device, the feature data into a plurality of sub-data, by using a corresponding splitting parameter in a splitting parameter set;
- performing an oblivious transfer, by the first computing device and with a second computing device, wherein the first computing device inputs the plurality of sub-data, and the second computing device inputs label data in a label dataset, wherein the second computing device selects target sub-data from the plurality of sub-data input by the first computing device and corresponding to the label data, wherein the plurality of sub-data corresponding to the label data are obtained by splitting feature data corresponding to the label data;
- determining, by the first computing device, a second summation result of one or more splitting parameters in the splitting parameter set; and
- sending, by the first computing device and to the second computing device, the second summation result, wherein the second computing device calculates a statistical indicator based on the second summation result, and a first summation result of the target sub-data selected by the second computing device.

14. The computer-readable medium according to claim 13, wherein there is a mapping relationship between the one or more splitting parameters in the splitting parameter set and the feature data in the feature dataset, such that each piece of feature data in the feature dataset is splittable by using the corresponding splitting parameter in the splitting parameter set.

15. The computer-readable medium according to claim 13, wherein each of the one or more splitting parameters is a different random number.

16. The computer-readable medium according to claim 13, wherein the statistical indicator is used to reflect a sum of feature data in the feature dataset corresponding to specific label data in the label dataset.

17. The computer-readable medium according to claim 13, wherein the second computing device calculates the statistical indicator by performing a difference calculation on the first summation result and the second summation result.

18. The computer-readable medium according to claim 13, wherein the label data in the label dataset includes at least one binary value that reflects a type of a service target, and the feature data in the feature dataset reflects one or more features of the service target.

* * * * *